United States Patent Office 3,029,284
Patented Apr. 10, 1962

3,029,284
N-DEALKYLATION OF CARBOXAMIDO-N-ALKYL-TETRACYCLINE AND ITS ANALOGS
Philip N. Gordon, Old Lyme, Conn., assignor to Chas. Pfizer & Co., Inc., Brooklyn, N.Y., a corporation of Delaware
No Drawing. Filed Sept. 14, 1960, Ser. No. 55,824
6 Claims. (Cl. 260—559)

This invention relates to a new and useful method for producing various antimicrobial agents. More particularly, it is concerned with a process for preparing various 6-deoxytetracyclines from their corresponding carboxamido N-alkylated derivatives.

In accordance with the prior art, various decarboxamido 2-cyanotetracycline-type compounds have been successfully subjected to the conditions of the Ritter reaction whereby the corresponding carboxamido N-alklylated tetracyclines are the principal products obtained. However, there has never been any known instance in the history of this reaction wherein the products obtained could be dealkylated in such a manner as to regenerate the corresponding unsubstituted amides, i.e., the N-dealkylated compounds or, in this particular case, the parent antibiotics themselves. In this connection, it is to be noted that previously available methods for the preparation of amides from nitriles all fail in the present instance, i.e., when the nitrile starting material happens to be a decarboxamido-2-cyanotetracycline-type compound.

In accordance with the present invention, it has now been discovered that various carboxamido N-alkyl-6-deoxytetracyclines can be N-dealkylated to the corresponding parent antibiotics via treatment with a strong mineral acid. More specifically, the process of this invention involves N-dealkylating a compound having the following general structural formula:

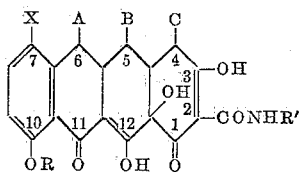

wherein X is a member selected from the group consisting of hydrogen, chlorine, bromine, nitro and amino; A is a member selected from the group consisting of hydrogen and methyl; B is a member selected from the group consisting of hydrogen and hydroxyl, said B being hydrogen when A is also hydrogen; C is a member selected from the group consisting of hydrogen and dimethylamino; R is a member selected from the group consisting of hydrogen, lower alkylsulfonyl, phenylsulfonyl, p-toluenesulfonyl, α-naphthalenesulfonyl and β-naphthalenesulfonyl, and R' is a hydrocarbon radical containing up to ten carbon atoms, said hydrocarbon radical being chosen from the group consisting of tertiary-alkyl, secondary-alkyl, cycloalkyl, α-arylalkyl, β-(aryl)tertiary-alkyl and β-(aryl)secondary-alkyl. This is accomplished by contacting a compound of the aforesaid formula with at least an equivalent amount in moles of a strong mineral acid such as concentrated sulfuric acid, concentrated hydrochloric acid, 85% ortho phosphoric acid, concentrated nitric acid, 85% sulfuric acid, and the like. When a 10-sulfonyl derivative of one of the aforesaid carboxamido N-alkyl-6-deoxytetracycline-type compounds is the starting material used, hydrolysis of the functional group at the 10-position of the molecule is simultaneously achieved along with the desired N-dealkylation, except that in the case when 85% sulfuric acid is the mineral acid employed the 10-sulfonyl derivative of the parent antibiotic is the reaction product obtained.

In accordance with the process of the present invention, an appropriate carboxamido N-alkyl-6-deoxytetracycline compound as previously defined is subjected to the N-dealkylating action of a strong mineral acid at a temperature that is in the range of from about 20° C. to about 100° C. until the N-dealkylation of said compound to the corresponding antibiotic base is substantially complete. In general, optimum results are obtained when the reaction is conducted for a period of from about one-half to about four hours within said temperature range. In carrying out the process of this invention, the appropriate carboxamido N-alkyl-6-deoxytetracycline compound is first dissolved in the strong mineral acid, employing an excess amount of the latter reagent, say, for example, from about two to about ten parts by volume of said acid to about one part by weight of the carboxamido N-alkyl-6-deoxytetracycline. The resulting solution is then allowed to stand at a temperature within the aforesaid range (say, for example, room temperature) for a period of at least one-half hour and preferably for from about one-half to about four hours. For recovery purposes, the reaction mixture may be carefully diluted with water, preferably employing from about one to about three volumes of water per volume of acid and taking the necessary precautions to ensure that the highly exothermic nature of the reaction is controlled within manageable limits throughout this step. The aqueous acid solution is then allowed to stand at room temperature for a period of about 1.5 to about 24 hours and in practice, it may be found most convenient to allow the reaction mixture to stand overnight at this particular point. Upon completion of this step, the desired 6-deoxytetracycline antibiotic compound is present in the form of a crystalline precipitate which can then be easily removed from said reaction solution by such means as suction filtration and the like.

The starting materials used in the process of this invention, viz., the aforementioned carboxamido N-alkyl-6-deoxytetracyclines, are all readily prepared from the corresponding decarboxamido 2-cyano-6-deoxytetracylines by employing the hereinafter described reaction procedure as more fully set forth in the examples to follow, which involves contacting a decarboxamido 2-cyano-6-deoxytetracycline of the aforesaid type in an alkane hydrocarbon carboxylic acid solvent medium under substantially anhydrous conditions with at least a one molar proportion of a hydrocarbon compound containing up to ten carbon atoms, said hydrocarbon compound being selected from the group consisting of an olefinic hydrocarbon containing an alkyl substituent on at least one of the unsaturated carbon atoms, an olefinic hydrocarbon containing an aryl substituent on one of the unsaturated carbon atoms, tertiary-alkanol, secondary-alkanol, cycloalkyl, α-arylalkanol, β-(aryl)tertiary-alkanol, β-(aryl)-secondary-alkanol and the acyl esters of all the aforesaid alkanols wherein the acyl moiety is derived from a hydrocarbon carboxylic acid containing up to eight carbon atoms. This reaction is ordinarily conducted at a temperature that is in the range of from about 5° C. to about 40° C. for a period of about one to about forty hours in the presence of an excess of an acid chosen from the group consisting of concentrated sulfuric acid and a hydrocarbon sulfonic acid such as methanesulfonic acid, ethanesulfonic acid, benzenesulfonic acid, p-toluenesulfonic acid, and the like. The decarboxamido 2-cyano-6-deoxytetracyclines so employed are, in turn, most conveniently synthesized by the method reported by F. A. Hochstein et al. in the Journal of the American Chemical Society, vol. 75, p. 5468 (1953), for the corresponding tetracyclines. In accordance with this method, the appropriate 6-deoxytetracycline is treated with an alkyl or arylsulfonyl halide in the presence of an organic base so as to convert the carboxamido group to a cyano group.

The 6-deoxytetracyclines used as starting materials are best prepared by the catalytic hydrogenation of the corresponding tetracyclines in accordance with the procedure reported in the Journal of the American Chemical Society, vol. 80, p. 5324 (1958). The synthetic routes employed in varying the substituent groups at the 7-position of the molecule are fully described in the examples to follow. Briefly speaking, they involve first preparing the 7-amino-type compounds by reacting the appropriate tetracycline with an aromatic diazonium salt followed by catalytic hydrogenation of the resulting azo intermediate; the 7-amino group is then converted to the other substituents by standard methods involving the classical diazonium salt route. In the case of the 4-desdimethylaminotetracycline-type starting materials, preparation is accomplished via procedures well-known in the art as more fully set forth in the hereinafter described examples. These procedures all involve either the use of zinc and acid on the corresponding dimethylamino compounds or else they entail subjecting the quaternary salts of said dimethylamino compounds to these same reaction conditions.

The alkylating agents employed in the herein described process, i.e., the hydrocarbon compounds capable of providing carbonium ions under the conditions of the reaction, are either commercially available or else they are easily obtainable by the conventional methods of organic synthesis. Specific examples of the type compounds which can be utilized include isobutylene, diisobutylene, tertiary-butanol, tertiary-amyl alcohol, hexene, heptene, octenes, allylbenzene, benzyl alcohol, dimethylbenzyl carbinol, and the like.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to the skilled in the art without departing from the spirit of the present invention and/or the scope of the appended claims.

*Example I*

One molecular proportion of aniline is dissolved in 2 N HCl, employing about 20 ml. thereof per gram of aniline, and the resultant solution is treated with one molecular proportion of sodium nitrate at 0–10° C. The resulting benzene diazonium chloride solution is then mixed at 0–20° C. with an aqueous solution consisting of one molecular proportion of tetracycline base and an equivalent quantity of sodium hydroxide, and containing sufficient sodium carbonate to neutralize the excess HCl in the diazotized aniline solution. The pH of the solution is in the range of pH 8–10. Stirring is continued at 0° C. for approximately two hours during which time the crude 7-phenylazotetracycline separates. The product is then collected on a filter funnel, and subsequently washed and air-dried to constant weight. This material exhibits an ultraviolet absorption maxima when dissolved in 0.01 N methanolic HCl at 255 and 435 m$\mu$ with shoulders at 375 m$\mu$ and 540 m$\mu$. On boiling the acid solution, the absorption changes to 240, 375 and 530 m$\mu$ with a shoulder at 300 m$\mu$.

*Example II*

A solution consisting of one part by weight of 6-deoxytetracycline hydrochloride, five parts by weight of benzyl bromide and five parts by weight of propylene oxide in 20 parts by weight of acetone is refluxed for four hours. A calcium chloride drying tube is employed to exclude atmospheric moisture from the system. The propylene oxide is employed to act as a neutral acid scavenger to promote formation of the desired $N^4$-benzyl-6-deoxytetracycline betaine. The reaction mixture is then cooled to room temperature and the benzyl betaine precipitated from said solution by treatment with diethyl ether and hexane. Alternatively, the betaine can be recovered by evaporation of the acetone from the reaction mixture and extraction of the residue with a diethyl ether-hexane solvent mixture, the benzyl betaine being insoluble in said mixture. The product so obtained is characterized by means of elementary analysis indicating the composition $C_{29}H_{30}N_2O_7$ and by an ultra-violet absorption maximum at about 349 m$\mu$ when dissolved in 0.01 N methanolic HCl. $N^4$-benzyl-6-deoxytetracycline betaine is essentially inactive in the *K. pneumonia* in vitro assay commonly employed for the tetracycline antibiotics.

*Example III*

The betaine of Example II (20 g.) is dissolved in 400 ml. of dry dioxane and treated with 2 g. of diazomethane in 100 ml. of anhydrous diethyl ether at 10° C. When nitrogen evolution ceases, the solution is evaporated to dryness in vacuo. The residual $N^4$-benzyl-6-deoxytetracycline betaine monomethyl ether is triturated with hexane and collected on a filter. It is characterized by a terminal ultra-violet absorption maximum at about 352 m$\mu$ and a methoxyl content, determined by analysis, corresponding to one methoxy-ether group per mole of final product. The monoethyl ether of $N^4$-benzyl-6-demethyl-7-chlortetracycline betaine is prepared in an analogous fashion with comparable results. It is not clear whether the single ether group is located in the 11- or the 12-position of the molecule due to the tautomeric relationship which exists between these two hydroxyl groups in the parent compounds.

*Example IV*

The procedure of Example I is repeated employing $N^4$-benzyl-6-deoxytetracycline betaine monomethyl ether in place of the tetracycline base and 1.2 moles of aniline. In this particular case, a higher yield of coupling product is obtained than when tetracycline antibiotic base is used in the process. Coupling appears to take principally at the 7-position of the molecule.

*Example V*

One part by weight of the product of Example IV is mixed with 20 parts by weight of methanol (other lower alkanols containing up to about four carbon atoms may also be used) and to the resulting mixture there is then added 0.20 part by weight of a 5% palladium-on-carbon hydrogenation catalyst. The resulting suspension is then subjected to a pressure of 30–45 p.s.i. of hydrogen in a conventional hydrogenation apparatus at 30° C. until three molecular proportions of hydrogen have reacted. The catalyst is then filtered, and the filtrate evaporated to dryness. The residue comprises a mixture of aniline and 7-amino-6-deoxytetracycline monomethyl ether. Hydrogenolysis in this fashion not only results in transformation of the aromatic azo substituent into the amino group, but also cleaves the $N^4$-benzyl group thus disrupting the betaine function. The aniline is removed from the crude product by washing the latter material with diethyl ether to yield an ether-insoluble cake of 7-amino-6-deoxytetracycline monomethyl ether. This product is then dissolved in 6 N $H_2SO_4$ and warmed on the steam bath for one hour, the excess sulfuric acid being subsequently neutralized by adjusting to pH 1.5 with sodium hydroxide. The 7-amino-6-deoxytetracycline sulfate so obtained is then isolated from the cooled acidified solution by means of exhaustive extraction with n-butanol, followed by concentration of the resultant extracts until precipitation first occurs. The amphoteric form of 7-amino-6-deoxytetracycline crystallizes on adjusting an aqueous solution of the sulfate to pH 5.5.

Example VI

The procedure of Example V is repeated employing the benzene diazonium chloride $N^4$-benzyl-6-demethyl-7-chlortetracycline betaine monomethyl ether coupling product of Example III as starting material, using platinum oxide as the catalyst and ethanol as solvent. 7-amino-6-demethyl-6-deoxytetracycline monomethyl ether is the product obtained and it is subsequently hydrolyzed in analogous fashion. The amphoteric form of 7-amino-6-demethyl-6-deoxytetracycline is obtained by adjusting the hydrolysis mixture to pH 5.5. Recovery of this product as the magnesium salt occurs if an equivalent amount of magnesium chloride is added to the mixture before the aforementioned neutralization to pH 5.5.

Example VII

Three parts by weight of the product of Example V is mixed with 10 parts by weight of 10% aqueous hydrochloric acid at 0° C. and diazotized by the gradual addition of 20% aqueous sodium nitrite solution. Addition of the sodium nitrite solution is continued until a positive starch iodide test on a few drops of the reaction mixture is obtained in the conventional fashion. The resulting solution is then added to 15 parts of a boiling 10% solution of cuprous chloride in aqueous hydrochloric acid. The reaction mixture so obtained is boiled for ten minutes and then allowed to a cool to room temperature. The product is recovered from said cooled mixture by diluting same with 100 parts by weight of water and extracting the resulting aqueous solution with n-butanol as previously indicated. Subsequent concentration of these extracts affords 7-chloro-6-deoxytetracycline hydrochloride as a crystalline precipitate, and treatment of the latter compound with an equivalent quantity of base provides amphoteric 7-chloro-6-deoxytetracycline. This product has a high degree of antibiotic activity against tetracycline resistant organisms and it possesses superior acid stability.

Example VIII

The process of Example VII is repeated substituting hydrobromic acid and a cuprous bromide solution as the reagents of choice in lieu of the corresponding chlorides. The resulting product obtained in this manner is 7-bromo-6-deoxytetracycline hydrobromide which is then converted to the amphoteric form in the same manner as herein before described for the corresponding hydrochloride.

Example IX

The procedures of Examples VII and VIII are adapted to the preparation of the 7-chloro- and 7-bromo derivatives of 6-demethyl-6-deoxytetracycline by operation on 7-amino-6-demethyl-6-deoxytetracycline, the product of Example VI. The respective products are obtained in analogous fashion in each instance.

Example X 7-amino-6-demethyl-6-deoxytetracycline (4.3 g.) is dissolved in 20 ml. of 6 N nitric acid and treated with 7.0 g. of sodium nitrite. The diazonium nitrate solution is then mixed with a suspension of cuprous oxide in water, which is prepared by reducing an aqueous solution of copper sulfate, consisting of approximately 5 g. of said salt in 50 ml. of water, with an alkaline glucose solution which is subsequently neutralized with acetic acid. A reaction ensues with the evolution of nitrogen. The mixture is then strongly acidified to decompose the copper complexes, and the 7-nitro-6-demethyl-6-deoxytetracycline is subsequently extracted from the solution with methyl isobutyl ketone.

This substance can also be prepared together with 9-nitro-6-deoxy-6-deoxytetracycline by the direct nitration of 6-demethyl-6-deoxytetracycline in accordance with the procedure which follows. One gram of 6-demethyl-6-deoxytetracycline hydrochloride is dissolved in approximately 10 ml. of concentrated sulfuric acid at 0–5° C. and treated with 1.4 ml. of a 10:1 concentrated sulfuric acid 70% nitric acid solution in dropwise fashion with stirring at 0–5° C. during a 15 minute period. The solution is then poured into 400 ml. of anhydrous diethyl ether. The nitro-6-demethyl-6-deoxytetracyclines precipitate as the acid sulfate addition salts. The precipitate is collected on a filter funnel, and air-dried. The crude nitration product so obtained is then crystallized from about 5 ml. of methanol to yield 0.7 g. of a mixture consisting of 7-nitro- and 9-nitro-6-demethyl-6-deoxytetracycline. The mixture is separated by means of column partition chromatography, employing a toluene-pyridine-water system. The 7-nitro product is the less polar component and it is, therefore, the first to be eluted. It has in vitro inhibitory activity corresponding to 4100 mcg. of tetracycline per milligram of substance as measured by the conventional *K. pneumonia* bioassay technique. It exhibits ultra-violet absorption maxima in 0.01 N methanolic HCl at 263 and 354 m$\mu$. The acid sulfate addition salt has infrared absorption bands at the following wave lengths (1% concentration in KBr pellet); 2.95, 3.21, 6.0, 6.18, 6.30, 6.54, 6.80, 7.48, 7.73, 8.20, 8.95 and 9.52$\mu$. Comparison of the half wave potential of this substance with those of o and p-nitrophenol measured with a dropping mercury electrode confirms the location of the nitro group at the 7-position of the molecule para to the 10-hydroxyl group.

The diazonium replacement method has the advantage of producing only the highly active 7-nitro isomer and thus obviates the separation process outlined above.

Example XI

One part by weight of amphoteric 6-deoxytetracycline is added to 20 parts by weight of 3% hydrochloric acid, the resulting solution is cooled to about 5° C., and two parts by weight of zinc dust is gradually added to said solution over a period of about 20 minutes. The reaction mixture is then stirred continuously with a volume of chloroform equal to that of the aqueous solution for several additional hours. At the end of this period, the resulting chloroform layer is separated and then concentrated in vacuo to provide 4-desdimethylamino-6-deoxytetracycline.

Example XII

To a solution consisting of 2.5 g. of 6-demethyl-6-deoxytetracycline hydrochloride dissolved in 7 ml. of pyridine at 5° C. there is added 3.6 g. of benzene-sulfonyl chloride. The resulting reaction mixture is then allowed to stand at this temperature for approximately 16 hours. At the end of this period the solution is poured into 50 ml. of diethyl ether to precipitate a gummy solid that is subsequently collected on a filter funnel by means of suction filtration. Trituration of the latter material with 25 ml. of water yields a crystalline product which is readily recrystallized from dimethylformamide to afford pure decarboxamido 2-cyano-6-demethyl-6-deoxy-10-benzenesulfonyltetracycline. Acid hydrolysis of the latter compound, employing concentrated sulfuric as the catalyst, affords the desired decarboxamido 2-cyano-6-demethyl-6-deoxytetracycline in good yield.

When this same procedure is repeated using p-toluenesulfonyl chloride in place of benzenesulfonyl chloride, the corresponding product obtained is decarboxamido 2-cyano - 6 - demethyl-6-deoxy-10-(p-toluenesulfonyl)tetracycline. Similarly, the use of other lower alkylsulfonyl chlorides such as methanesulfonyl chloride, ethanesulfonyl chloride and 1-butanesulfonyl chloride, in lieu of the aforementioned arylsulfonyl chlorides, affords the corresponding decarboxamido 2-cyano-6-demethyl-6-deoxy-10-alkylsulfonyltetracycline in each and every case. In like manner, the use of either α- or β-naphthalenesulfonyl chloride as the sulfonyl chloride of choice in this same reaction affords the corresponding decarboxamido 2-cyano-6-demethyl-6-deoxy-10-naphthalenesulfonyltetracycline compound in each instance. All of these so produced 10-sulfonyl compounds are readily hydrolyzed to decarboxamido 2-cyano-6-demethyl-6-deoxytetracycline as previously indicated.

In the same manner, each of the other decarboxamido 2-cyanotetracyclines used as starting materials in the examples to follow may be prepared by substituting the appropriate tetracycline acid addition salt in place of 6-demethyl-6-deoxytetracycline hydrochloride and taking care to employ the proper molar amounts of starting material and reagent in each case. Thus, when 2.8 g. of 6-deoxy-7-chlorotetracycline hydrochloride is treated with 3.6 g. of ethanesulfonyl chloride in 7 ml. of pyridine, the corresponding product obtained is decarboxamido 2-cyano-6-deoxy-7-chloro-10-ethanesulfonyltetracycline which is readily hydrolyzed to decarboxamido 2-cyano-6-deoxy-7-chlorotetracycline by means of concentrated sulfuric acid in the usual manner.

*Example XIII*

To a well-stirred mixture consisting of 10 g. (0.025 mole) of decarboxamido 2-cyano-6-demethyl-6-deoxytetracycline dissolved in 100 ml. of glacial acetic acid there are added 18 ml. of concentrated sulfuric acid. After cooling the resulting solution to 15° C., 9 g. (0.160 mole) of isobutylene is introduced into the reaction mixture by bubbling the gas into the cooled liquid. Constant agitation is maintained throughout the latter step as well as for an additional period of time after its completion (say, for example, approximately 16 hours), during which time the temperaure of the reaction mixture is kept at 5° C. At the end of this period, the resulting mixture is extracted with an equal volume of an alkane hydrocarbon solvent consisting of a technical mixture of pentanes and hexanes in order to remove any polymerized isobutylene that may have formed during the course of the reaction. The acetic acid layer which then separates at this point is removed and poured into 1000 ml. of ice-water, and the resulting aqueous acidic solution is subsequently neutralized with dilute sodium hydroxide. The neutralized aqueous solution so obtained is then extracted with three-250 ml. portions of chloroform, and the separated chloroform layers are subsequently combined, washed with water and dried over anhydrous sodium sulfate. After removal of the drying agent by means of filtration and concentration of the resultant filtrate under reduced pressure, there is obtained the desired product, viz., carboxamido N-(tertiary-butyl)-6-demethyl-6-deoxytetracycline, in the form of a crystalline precipitate.

*Example XIV*

The procedure described in Example XIII is followed except that the 10-benzenesulfonyl derivative of decarboxamido 2-cyano-6-demethyl-6-deoxytetracycline is the starting material employed. Thus, when 13.5 g. (0.025 mole) of decarboxamido 2-cyano-6-demethyl-6-deoxy-10-benzenesulfonyltetracycline is contacted in 100 ml. of glacial acetic acid with 9 g. (0.160 mole) of isobutylene in the presence of 18 ml. of concentrated sulfuric acid, in the manner of the previous example, the corresponding product obtained is carboxamido N-(tertiary-butyl)-6-demethyl-6-deoxy-10-benzenesulfonyltetracycline, M.P. 211–212° C. d.

*Analysis.*—Calcd. for $C_{31}H_{34}N_2O_9S \cdot 3H_2O$: C, 56.01; H, 6.07; N, 4.22. Found: C, 55.72; H, 5.48; N, 4.17.

*Example XV*

The procedure described in Example XIII is followed except for the fact that decarboxamido 2-cyano-6-deoxy-7-chlorotetracycline is the starting material employed. Thus when 11.2 g. (0.025 mole) of the latter compound is contacted in 100 ml. of glacial acetic acid with 9 g. (0.160 mole) of isobutylene in the presence of 18 ml. of concentrated sulfuric acid in the manner of Example XIII, the corresponding product obtained is carboxamido N-(tertiary-butyl)-6-deoxy-7-chlorotetracycline.

In like manner and by employing the proper amounts of reactant and reagent in each case, decarboxamido 2-cyano-6-demethyl-6-deoxy-7-bromotetracycline is converted to carboxamido N-(tertiary-butyl)-6-demthyl-6-deoxy-7-bromotetracycline, and carboxamido 2-cyano-6-deoxy-7-chloro-10-ethanesulfonyltetracycline is converted to carboxamido N-(tertiary-butyl)-6-deoxy-7-chloro-10-ethanesulfonyltetracycline.

Inasmuch as the other compounds required for the present invention can be prepared in accordance with the procedure of this example, the following list of decarboxamido 2-cyano-6-deoxytetracycline starting materials is presented below in order to avoid unnecessary repetition of experimental detail; in each and every case, the corresponding carboxamido N-(tertiary-alkyl)-6-deoxytetracycline is the product obtained:

Decarboxamido 2-cyano-6-demethyl-6-deoxy-10-(α-naphthalenesulfonyl)tetracycline
Decarboxamido 2-cyano-5-oxy-6-deoxytetracycline
Decarboxamido 2 - cyano-4-desdimethylamino-6-deoxytetracycline
Decarboxamido 2-cyano-6-demethyl-6-deoxy-7-nitrotetracycline
Decarboxamido 2-cyano-6-deoxy-7-aminotetracycline
Decarboxamido 2-cyano-6-demethyl-6-deoxy-10-(p-toluenesulfonyl)tetracycline

*Example XVI*

The procedure described in Example XIII is followed except for the fact that 2-methylbutene-2 is the alkylating agent employed in lieu of isobutylene. Thus, when 11.2 g. (0.160 mole) of 2-methylbutene-2 is bubbled into a solution consisting of 10 g. (0.025 mole) of decarboxamido 2-cyano-6-demethyl-6-deoxytetracycline dissolved in 100 ml. of glacial acetic acid containing 18 ml. of concentrated sulfuric acid and the reaction is carried out in accordance with the procedure of Example XIII, the corresponding product obtained is carboxamido N-(tertiary-amyl)-6-demethyl-6-deoxytetracycline.

In the same manner and by employing the appropriate molar quantities of starting material and alkylating agent in each case, decarboxamido 2-cyano-6-deoxy-7-chlorotetracycline and propylene react to afford carboxamido N-(isopropyl)-6-deoxy-7-chlorotetracycline; decarboxamido 2-cyano-6-demethyl-6-deoxy-10-benzenesulfonyltetracycline and octylethylene react to afford carboxamido N - [α - (octyl)ethyl]-6-demethyl-6-deoxy-10-benzenesulfonyltetracycline; decarboxamido 2-cyano-6-demthyl-6-deoxy-7-bromotetracycline and cyclopentene react to afford carboxamido N - (cyclopentyl) - 6 - demethyl-6-deoxy-7-bromotetracycline; decarboxamido 2-cyano-5-oxy-6-deoxytetracycline and styrene react to afford carboxamido N-(α-phenylethyl)-5-oxy-6-deoxytetracycline; and decarboxamido 2-cyano-6-deoxy-7-aminotetracycline and α-methylstyrene react to afford carboxamido N-[β-(phenyl)-isopropyl]-6-deoxy-7-aminotetracycline.

*Example XVII*

The procedure described in Example XIII is followed except that tertiary-butanol is employed as the alkylating agent of choice in lieu of isobutylene. In this particular case, 1.85 g. (0.025 mole) of tertiary-butanol is slowly added into a reaction flask containing a well-stirred, slightly chilled (15° C.) solution consisting of 10 g. (0.025 mole) of decarboxamido 2-cyano-6-demethyl-6-deoxytetracycline and 18 ml. of concentrated sulfuric acid and dissolved in 100 ml. of glacial acetic acid. The resulting mixture is then stirred for an additional 36 hours at 10° C. The remainder of the procedure to be followed is exactly the same as that described in Example XIII, and the product obtained, viz., carboxamido N-(tertiary-butyl)-6-demethyl-6-deoxytetracycline, is identical in every respect with that of the aforesaid example as attested to by melting point and mixed melting point determinations.

In like manner and by employing appropriate molar quantities of reactant and reagent in each case, decarboxamido 2-cyano-6-demethyl-6-deoxytetracycline and tertiary-amyl alcohol react to afford carboxamido N-(tertiary-amyl)-6-demethyl-6-deoxytetracycline, while decarboxamido 2-cyano-6-deoxy-7-chlorotetracycline and tri-n-propyl carbinol react to afford carboxamido N-(tertiary-decyl)-6-deoxy-7-chlorotetracycline. Inasmuch as the other compounds required as starting materials for the present invention can be prepared in accordance with this procedure, the following list of suitable decarboxamido 2-cyano starting materials and alkylating agents is presented below in order to avoid unnecessary repetition of experimental detail; in each and every case, the corresponding carboxamido N-(tertiary-alkyl)-6-deoxytetracycline is the product obtained:

| Decarboxamido 2-Cyano-6-deoxytetracycline | Alkylating Agent |
| --- | --- |
| decarboxamido 2-cyano-6-demethyl-6-deoxy-10-benzenesulfonyltetracycline | octanol-2. |
| decarboxamido 2-cyano-6-deoxy-7-chloro-10-ethanesulfonyltetracycline | cyclohexanol. |
| decarboxamido 2-cyano-6-demethyl-6-deoxy-10-(β-naphthalenesulfonyl)tetracycline | tertiary-butanol. |
| decarboxamido 2-cyano-5-oxy-6-deoxytetracycline | benzyl alcohol. |
| decarboxamido 2-cyano-6-deoxy-7-aminotetracycline | α-phenylethanol. |
| decarboxamido 2-cyano-6-demethyl-6-deoxy-7-bromotetracycline | 2-(p-tolyl)propanol-2. |
| decarboxamido 2-cyano-4-desdimethylamino-6-deoxy-7-chlorotetracycline | β-(tolyl)isopropanol. |
| decarboxamido 2-cyano-6-demethyl-6-deoxytetracycline | β-(phenyl)tertiary-butanol. |

*Example XVIII*

The procedure described in Example XIII is followed except that 20 g. of p-toluenesulfonic acid is employed in lieu of the 18 ml. of concentrated sulfuric acid used in the aforesaid example. In this particular case, the yield of carboxamido N-(tertiary-butyl)-6-demethyl-6-deoxytetracycline so obtained is substantially the same as that afforded by the procedure of Example XIII.

In like manner, other aromatic hydrocarbon sulfonic acids can be employed as condensing agents for this reaction in place of the p-toluenesulfonic acid used above. Thus, when 20 g. of β-naphthalenesulfonic acid is substituted for the p-toluenesulfonic acid in this manner, the results obtained are comparable in every respect to those of Example XIII.

*Example XIX*

The procedure of Example XIII is followed except that propionic acid is the solvent employed in lieu of glacial acetic acid. The carboxamido N-(tertiary-butyl)-6-demethyl-6-deoxytetracycline so obtained is isolated in a similar fashion and it proved to be identical in every respect with that of Example XIII.

*Example XX*

A solution consisting of 0.4 g. of carboxamido N-(tertiary-butyl)-6-demethyl-6-deoxy-10-benzenesulfonyltetracycline dissolved in 50 drops (2 ml.) of concentrated sulfuric acid is prepared. This solution is then allowed to stand for one hour at room temperature, after which time it is carefully diluted with twice its volume of water, employing external cooling throughout this step in order to abate the highly exothermic nature of the reaction. Upon standing for an additional 16 hours, a crystalline precipitate is observed to form in the resultant aqueous solution. This material is subsequently collected on a filter funnel by means of suction filtration and allowed to air dry until constant weight is attained. The yield of product amounted to 25 mg. and it proved to be a 2:1 mixture of 6-demethyl-6-deoxytetracycline and its carboxamido N-(tertiary-butyl)derivative as revealed by paper chromatographic analysis.

*Example XXI*

The procedure described in Example XX is followed except that other carboxamido N-alkyl-6-demethyl-6-deoxytetracyclines are individually employed as the starting materials in lieu of that used in the foregoing example. Thus, when 0.4 g. of carboxamido N-(tertiary-butyl)-6-deoxy-7-chlorotetracycline is dissolved in 2 ml. of concentrated sulfuric acid and then diluted with twice its volume of water in the manner of Example XX, the corresponding product obtained is 6-deoxy-7-chlorotetracycline.

In like manner and by using the same ratio of starting material and reagent as is used in Example XX, carboxamido N-(tertiary-butyl)-6-deoxy-7-bromotetracycline is converted to 6-deoxy-7-bromotetracycline; carboxamido N-(tertiary-butyl)-5-oxy-6-deoxytetracycline is converted to 5-oxy-6-deoxytetracycline; and carboxamido N-(tertiary-butyl)-4-desdimethylamino-6-deoxytetracycline is converted to 4-desdimethylamino-6-deoxytetracycline. Inasmuch as many other compounds that fall within the scope of the present invention can also be prepared in accordance with this procedure, the following list of carboxamido N-alkyl-6-deoxytetracycline starting materials is presented below in order to avoid unnecessary repetition of experimental detail; in each and every case, the corresponding N-dealkylated compound, i.e., the 6-deoxytetracycline antibiotic itself, is the product obtained:

Carboxamido N-(tertiary-butyl)-6-demethyl-6-deoxy-7-nitrotetracycline

Carboxamido N-(tertiary-butyl)-6-deoxy-7-aminotetracycline

Carboxamido N-(tertiary-amyl)-6-demethyl-6-deoxytetracycline

Carboxamido N-(isopropyl)-6-deoxy-7-chlorotetracycline

Carboxamido N-(cyclopentyl)-6-demethyl-6-deoxy-7-bromotetracycline

Carboxamido N-(α-phenylethyl)-5-oxy-6-deoxytetracycline

Carboxamido N-(β-phenylisopropyl)-6-deoxy-7-aminotetracycline

Carboxamido N-(tertiary-decyl)-6-deoxy-7-chlorotetracycline

Carboxamido N-(benzyl)-5-oxy-6-deoxytetracycline

Carboxamido N-(α-phenylethyl)-6-deoxy-7-aminotetracycline

Carboxamido N-[β-(p-tolyl)secondary-propyl]-6-demethyl-6-deoxy-7-bromotetracycline Carboxamido N-[β-(p-tolyl)isopropyl]-4-desdimethylamino-6-deoxy-7-chlorotetracycline Carboxamido N-[α-(phenyl)tertiary-butyl]-6-demethyl-6-deoxytetracycline

*Example XXII*

The procedure described in Example XX if followed except that other strong mineral acids, such as concentrated hydrochloric acid, 85% ortho phosphoric acid, and concentrated nitric acid, are each individually used in place of concentrated sulfuric acid, with comparable results being obtained in each case.

*Example XXIII*

The procedure described in Example XX is followed except that 85% sulfuric acid is the reagent of choice employed in lieu of the concentrated sulfuric acid of the aforementioned example. In this case, however, carboxamido-N-(tertiary-butyl)-6-demethyl-6-deoxy-10-benzenesulfonyltetracycline is converted to 6-demethyl-6-deoxy-10-benzenesulfonyltetracycline. In like manner, carboxamido N-(tertiary-butyl)-6-deoxy-7-chloro-10-ethanesulfonyltetracycline is converted to 6-deoxy-7-chloro-10-ethanesulfonyltetracycline, and carboxamido N-(tertiary-butyl)-6-demethyl-6-deoxy-10-(α-naphthalenesulfonyl)tetracycline is converted to 6-demethyl-6-deoxy-10-(α- naphthalenesulfonyl)tetracycline. The other compounds that fall within the purview of the present invention can be prepared in accordance with this very same procedure. Accordingly, the following list of carboxamido N-alkyl-6-deoxy-10-sulfonyltetracycline starting materials is presented below for the sake of convenience and in order to avoid unnecessary repetition of experimental detail; in each and every case, the corresponding 6-deoxy-10-sulfonyltetracycline is the product obtained:

Carboxamido N-[α-(octyl)ethyl]-6-demethyl-6-deoxy-10-benzenesulfonyl-tetracycline Carboxamido N-(tertiary-butyl)-6-demethyl-6-deoxy - 10-(β-naphthalene-sulfonyl)tetracycline Carboxamido N - (secondary-octyl)-6-demethyl-6-deoxy-10-benzenesulfonyltetracycline Carboxamido N-(cyclohexyl)-6-deoxy - 7-chloro-10-ethanesulfonyltetracycline Carboxamido N-(tertiary-butyl)-6-demethyl-6-deoxy -10-(p-toluenesulfonyl)-tetracycline

*Example XXIV*

The procedure described in Example XX is followed except that the individual starting materials employed are the final products reported in Example XXIII. In each and every instance, the corresponding product obtained is the appropriate 6-deoxy-10-desulfonyltetracycline compound.

Thus, when 6-demethyl-6-deoxy-10-benzenesulfonyltetracycline is subjected to the process of this procedure, 6-demethyl-6-deoxytetracycline is the product obtained. In like manner, each of the other 6-deoxy-10-sulfonyltetracyclines are converted to the corresponding free 10-hydroxy compounds, many of which are identical with those already reported in Example XXI that were prepared by the alternate one-step route.

What is claimed is:

1. The process which comprises contacting carboxamido N-alkyl-6-deoxytetracycline of the formula:

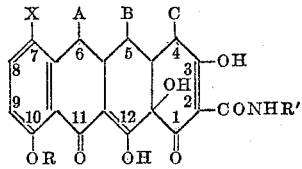

wherein X is a member selected from the group consisting of hydrogen, chlorine, bromine, nitro and amino; A is a member selected from the group consisting of hydrogen and methyl; B is a member selected from the group consisting of hydrogen and hydroxyl, said B being hydrogen when A is also hydrogen; C is a member selected from the group consisting of hydrogen and dimethylamino; R is a member selected from the group consisting of hydrogen, lower alkylsulfonyl, phenylsulfonyl, p-toluenesulfonyl, α-naphthalenesulfonyl and β-naphthalenesulfonyl, and R' is a hydrocarbon radical containing up to ten carbon atoms, said hydrocarbon radical being chosen from the group consisting of tertiary-alkyl, secondary-alkyl, cycloalkyl, α-arylalkyl, β-(aryl)tertiary-alkyl and β-(aryl)-secondary-alkyl, with at least an equivalent amount in moles of a strong mineral acid until the N-dealkylation of said compound has occurred.

2. The process which comprises contacting carboxamido N-alkyl-6-deoxytetracycline of the formula:

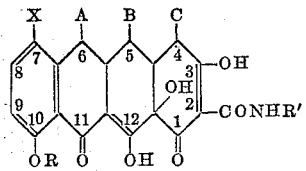

wherein X is a member selected from the group consisting of hydrogen, chlorine, bromine, nitro and amino; A is a member selected from the group consisting of hydrogen and methyl; B is a member selected from the group consisting of hydrogen and hydroxyl, said B being hydrogen when A is also hydrogen; C is a member selected from the group consisting of hydrogen and dimethylamino; R is a member selected from the group consisting of hydrogen, lower alkylsulfonyl, phenylsulfonyl, p-toluenesulfonyl, α-naphthalenesulfonyl and β-naphthalenesulfonyl, and R' is a hydrocarbon radical containing up to ten carbon atoms, said hydrocarbon radical being chosen from the group consisting of tertiary-alkyl, secondary-alkyl, cycloalkyl, α-arylalkyl, β-(aryl)-tertiary-alkyl and β-(aryl)-secondary-alkyl, with at least an equivalent amount in moles of a strong mineral acid chosen from the group consisting of concentrated sulfuric acid, concentrated hydrochloric acid, 85% ortho phosphoric acid, concentrated nitric acid and 85% sulfuric acid.

3. The process which comprises subjecting carboxamido N-alkyl-6-deoxy-tetracycline of the formula:

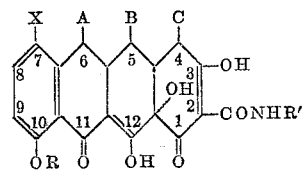

wherein X is a member selected from the group consisting of hydrogen, chlorine, bromine, nitro and amino; A is a member selected from the group consisting of hydrogen and methyl; B is a member selected from the group consisting of hydrogen and hydroxyl, said B being hydrogen when A is also hydrogen; C is a member selected from the group consisting of hydrogen and dimethylamino; R is a member selected from the group consisting of hydrogen, lower alkylsulfonyl, phenylsulfonyl, α-naphthalenesulfonyl and β-naphthalenesulfonyl, and R' is a hydrocarbon radical containing up to ten carbon atoms, said hydrocarbon radical being chosen from the group consisting of tertiary-alkyl, secondary-alkyl, cycloalkyl, α-arylalkyl, β-(aryl)-tertiary-alkyl and β-(aryl)secondary-alkyl, to the N-dealkylating action of at least an equivalent amount in moles of a strong mineral acid at a temperature that is in the range of from about 20° C. to about 100° C. until the N-dealkylation of said compound to the corresponding antibiotic base is substantially complete.

4. The process as claimed in claim 3 wherein the reaction is conducted for a period of from about one-half to about four hours.

5. The process as claimed in claim 3 wherein the ratio of mineral acid to carboxamido N-alkyl-6-deoxytetracycline compound employed is from about 2 to about 10 milliliters of acid to about one gram of said carboxamido N-alkyl-6-deoxytetracycline compound.

6. The process for preparing 6-deoxy-10-sulfonyltetracycline of the formula:

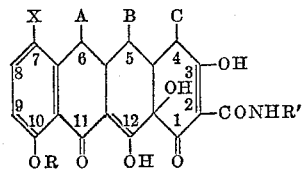

wherein X is a member selected from the group consisting of hydrogen, chlorine, bromine, nitro and amino; A is a member selected from the group consisting of hydrogen and methyl; B is a member selected from the group consisting of hydrogen and hydroxyl, said B being hydrogen when A is also hydrogen; C is a member selected from the group consisting of hydrogen and dimethylamino; R is a member selected from the group consisting of hydrogen, lower alkylsulfonyl, phenylsulfonyl, p-toluenesulfonyl, α-naphthalenesulfonyl and β-naphthalene-sulfonyl, and R' is hydrogen, which comprises contacting the corresponding carboxamido N-alkyl-6-deoxy-10 - sulfonyltetracycline wherein R' is a hydrocarbon radical containing up to ten carbon atoms, said hydrocarbon radical being chosen from the group consisting of tertiary-alkyl, secondary-alkyl, cycloalkyl, α-arylalkyl, β-(aryl) - tertiary-alkyl and β-(aryl)secondary-alkyl, with at least an equivalent amount in moles of 85% sulfuric acid until N-dealkylation of said compound has occurred.

No references cited.